(12) United States Patent
Murakami

(10) Patent No.: US 11,326,684 B2
(45) Date of Patent: May 10, 2022

(54) BREATHER

(71) Applicant: TOYOTA JIDOSHA KABUSHIKI KAISHA, Toyota (JP)

(72) Inventor: Yukinori Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/216,061

(22) Filed: Mar. 29, 2021

(65) Prior Publication Data

US 2021/0301914 A1    Sep. 30, 2021

(30) Foreign Application Priority Data

Mar. 31, 2020 (JP) .............................. JP2020-063966

(51) Int. Cl.
*F16H 57/02* (2012.01)
*F16H 57/027* (2012.01)

(52) U.S. Cl.
CPC ................................. *F16H 57/027* (2013.01)

(58) Field of Classification Search
CPC ............. F16H 57/027; F16H 2061/004; F16H 61/4174; F01M 13/0011; F01M 13/0033; F01M 2013/0438; H02K 5/20; H02K 2205/09
See application file for complete search history.

(56) References Cited

U.S. PATENT DOCUMENTS

| | | | | |
|---|---|---|---|---|
| 2,592,380 A | * | 4/1952 | Beckett ................ | F01M 13/023 137/501 |
| 3,198,208 A | * | 8/1965 | Tramontini .......... | F01M 13/023 137/480 |
| 3,227,010 A | * | 1/1966 | Daubuer .............. | F01M 13/022 408/1 R |

(Continued)

FOREIGN PATENT DOCUMENTS

| | | | | |
|---|---|---|---|---|
| JP | 2015094449 A | | 5/2015 | |
| JP | 2021032356 A | | 3/2021 | |
| KR | 20040040859 A | * | 5/2004 | ........... F16H 57/027 |

OTHER PUBLICATIONS

Machine translation of KR 20040040859 A obtained on Aug. 11, 2021.*

*Primary Examiner* — Adam D Rogers
(74) *Attorney, Agent, or Firm* — Hunton Andrews Kurth LLP

(57) ABSTRACT

A breather includes a case, which has an internal space, an insertion portion, and a valve structure. The insertion portion includes a connecting passage that connects the internal space and a external space. The valve structure includes a valve member in the connecting passage, a locking portion that restricts displacement of the valve member, and a spring that presses the valve member against the locking portion. The insertion portion includes a seating portion that is inclined such that the connecting passage narrows as the distance from the locking portion increases. The valve (Continued)

member includes a plate portion, and a ventilating portion that is a radially inward recess on the edge of the plate portion. The valve structure connects the external space and the internal space to each other via the ventilating portion in a state in which the valve member is in contact with the seating portion.

7 Claims, 5 Drawing Sheets

(56) References Cited

U.S. PATENT DOCUMENTS

| | | | | |
|---|---|---|---|---|
| 3,372,685 | A * | 3/1968 | Bestland | F01M 11/10 123/198 R |
| 3,455,285 | A * | 7/1969 | Sheppard | F01M 13/023 123/574 |
| 5,586,541 | A * | 12/1996 | Tsai | F01M 13/023 123/574 |
| 6,279,247 | B1 * | 8/2001 | Neitzel | E02F 9/006 137/493.4 |
| 7,604,020 | B2 * | 10/2009 | Kennedy | F16H 57/027 137/197 |
| 8,955,501 | B2 * | 2/2015 | Tanikawa | F01M 13/023 123/574 |
| 8,960,052 | B2 * | 2/2015 | Froehlich | B62D 3/12 74/606 R |
| 11,035,492 | B2 * | 6/2021 | Nakanishi | F01M 13/021 |
| 11,073,199 | B2 * | 7/2021 | Tan | F16H 57/027 |
| 2021/0066992 | A1 * | 3/2021 | Aoki | H02K 5/20 |

* cited by examiner

BREATHER

CROSS-REFERENCE TO RELATED APPLICATION

This application claims priority to Japanese Patent Application No. 2020-063966 filed on Mar. 31, 2020, incorporated herein by reference in its entirety.

BACKGROUND

1. Field

The present disclosure relates to a breather that includes a case, which has an internal space, and a valve, which seals the internal space.

2. Description of Related Art

Japanese Laid-Open Patent Publication No. 2015-94449 discloses a breather chamber provided in a case that accommodates a differential gear mechanism. A breather plug is attached to the case. The breather plug is designed to open to discharge air in the breather chamber when the pressure in the breather chamber increases. The breather plug includes a cylindrical breather body, which extends through the case housing, and a cap, which covers the entire breather body from outside the case. The cap incorporates a valve member, which closes an opening of the breather body, and a spring that presses the valve member against the breather body.

In the breather plug disclosed in the above-described publication, the valve member is separated from the breather body when the pressure in the breather chamber increases. When the pressure in the breather chamber decreases, so that the valve member is again pressed against the breather body, the valve member may be out of the proper orientation in the cap. For example, the valve member may be tilted. In such a case, the valve member may fail to contact the breather body so as to close the opening of the breather body.

That is, the breather has room for improvement in stabilization of displacement of the valve member when the breather plug repeatedly opens and closes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a breather includes a case and a valve device. The case includes an internal space, which is configured to accommodate a device. The valve device seals the internal space. The valve device is configured to open on a basis of a pressure difference between the internal space and an external space, which is a space outside the case, thereby performing at least one of suction of air from the external space to the internal space and discharge of air from the internal space to the external space. The valve device includes an insertion portion and a valve structure. The insertion portion extends through the case and includes a connecting passage, which connects the internal space and the external space to each other. The valve structure is configured to selectively close and open the connecting passage. The valve structure includes a valve member, a locking portion, and a spring. The valve member is arranged in the connecting passage and displaceable in the connecting passage. The locking portion restricts displacement of the valve member and includes a valve hole with a diameter less than a diameter of the valve member. The spring presses the valve member against the locking portion. The insertion portion includes a seating portion located on an opposite side of the valve member from locking portion. The seating portion is inclined such that the connecting passage narrows as a distance from the locking portion increases. The valve member includes a disk-shaped plate portion and a ventilation portion. The disk-shaped plate portion has a sealing surface, which has a diameter greater than the diameter of the valve hole. The ventilating portion is a radially inward recess on an edge of the plate portion. The valve structure is configured to: close the valve hole with the sealing surface contacting the locking portion, thereby closing the connecting passage; open the connecting passage by separating the valve member from the locking portion; and connect the external space and the internal space to each other via the ventilating portion in a state in which the valve member is separated from the locking portion and is in contact with the seating portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A breather 10 according to an embodiment will now be described with reference to FIGS. 1 to 10.

Figure 1:
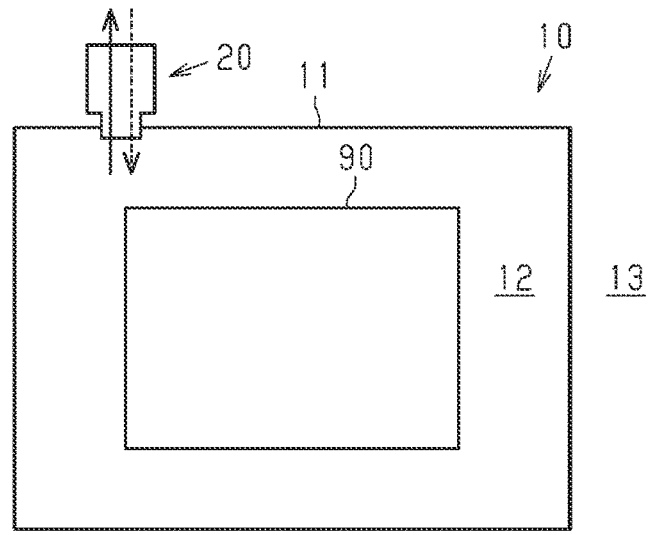
FIG. 1 is a schematic diagram showing a breather according to an embodiment.

FIG. 1 illustrates the breather 10 mounted on a vehicle. The breather 10 includes a case 11, which accommodates a gearbox 90 of the vehicle. The case 11 defines an internal space 12, in which the gearbox 90 is accommodated. In FIG. 1, the space outside the case 11 is defined as an external space 13.

The breather 10 includes a valve device 20, which is attached to the case 11. When the valve device 20 is in a closed state, the internal space 12 is sealed. The valve device 20 opens on the basis of the pressure difference between the internal space 12 and the external space 13. The manner in which the valve device 20 opens will be described below. When the valve device 20 is open, the breather 10 allows air to be drawn into the internal space 12 from the external space 13 as indicated by the arrow of a broken line in FIG. 1. Also, when the valve device 20 is closed, the breather 10 allows air to be discharged to the external space 13 from the internal space 12 as indicated by the arrow of a solid line in FIG. 1.

Figure 2:
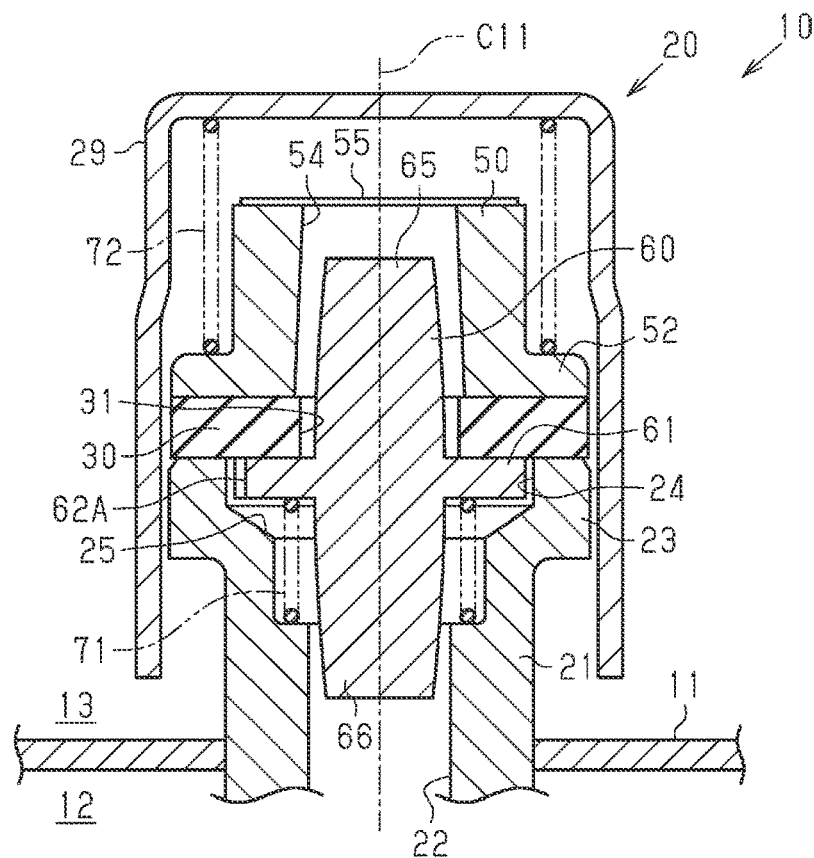
FIG. 2 is a cross-sectional view of a valve device of the breather shown in FIG. 1.

As shown in FIG. 2, the valve device 20 includes a cylindrical insertion portion 21, which extends through the case 11. The insertion portion 21 includes a connecting passage 22, which connects the internal space 12 and the external space 13 to each other. FIG. 2 shows an axis C11, which agrees with the central axis of the connecting passage 22. The valve device 20 includes a cover 29, which covers the insertion portion 21 from outside the case 11. Part of the cover 29 is fixed to the insertion portion 21 with a gap between the cover 29 and the insertion portion 21. The internal space 12 is connected to the external space 13 via the connecting passage 22 and the space in the cover 29. The valve device 20 includes a valve member 60, which is displaced on the basis of the pressure difference between the internal space 12 and the external space 13. The valve member 60 is made of, for example, a plastic. FIG. 2 shows the valve device 20 in a closed state.

Figure 3:
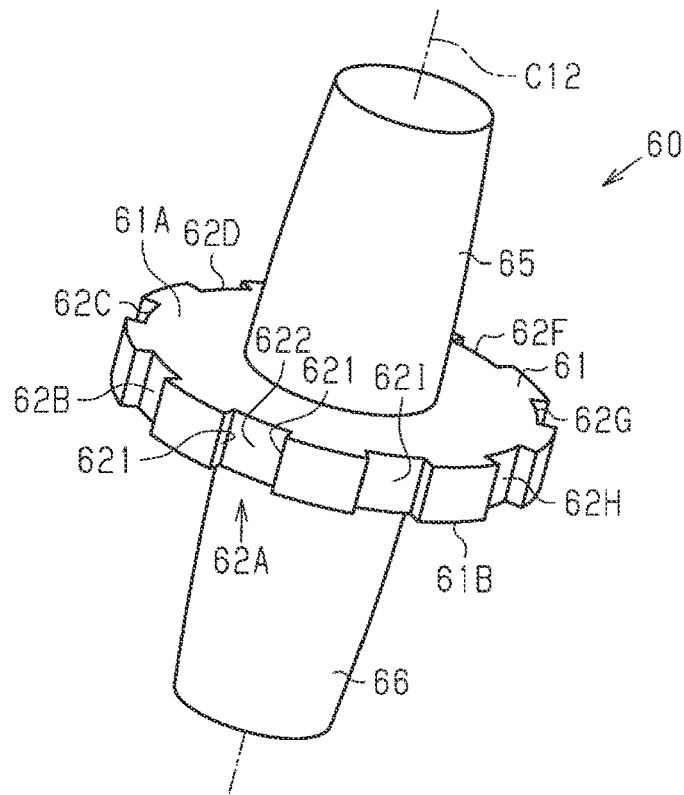
FIG. 3 is a perspective view of a valve member of the valve device shown in FIG. 2.

As shown in FIGS. 2 and 3, the valve member 60 includes a disk-shaped plate portion 61. The plate portion 61 of the valve member 60 is accommodated in the connecting passage 22 as shown in FIG. 2. More specifically, the plate portion 61 is accommodated in an opening 24 of the connecting passage 22. The opening 24 is provided at an end 23 of the insertion portion 21 and opens to the external space 13. The end 23 of the insertion portion 21, which includes the opening 24, is an open end and an outer end. The plate portion 61 includes a first surface 61A, which faces the outside of the connecting passage 22, and a second surface 61B, which faces the inside of the connecting passage 22. The valve member 60 includes a columnar pillar portion, which protrudes from both the first surface 61A and the second surface 61B of the plate portion 61. The pillar portion includes a first pillar portion 65 and a second pillar portion 66. The first pillar portion 65 protrudes from the first surface 61A of the plate portion 61. The second pillar portion 66 protrudes from the second surface 61B of the plate portion 61. The second pillar portion 66 is inserted into the connecting passage 22. A gap exists between the second pillar portion 66 and the insertion portion 21. The plate portion 61 includes a side surface, which is connected to the first surface 61A and the second surface 61B. The side surface of the plate portion 61 is also referred to as a circumferential surface or a circumferential edge.

The first pillar portion 65 and the second pillar portion 66 have shapes that are symmetrical with respect to the plate portion 61, which serves as a symmetry plane. The diameter of the first pillar portion 65 in the first surface 61A is less than the diameter of the plate portion 61. The diameter of the second pillar portion 66 in the second surface 61B is less than the diameter of the plate portion 61. The diameters of the first pillar portion 65 and the second pillar portion 66 decrease as the distances from the plate portion 61 increase. The central axis of the first pillar portion 65 passes through the center (center in the radial direction) of the plate portion 61. The central axis of the second pillar portion 66 agrees with the central axis of the first pillar portion 65. FIG. 3 shows an axis C12, which agrees with the central axes of the first pillar portion 65 and the second pillar portion 66. The axis C12 is also the central axis of the valve member 60. The diameter of the plate portion 61 refers to the dimension of the plate portion 61 on a straight line orthogonal to the axis C12. In FIG. 2, the central axis of the valve member 60 agrees with the axis C11.

As shown in FIG. 2, the diameter of the connecting passage 22 at the position of the opening 24 is greater than the diameter of the plate portion 61 of the valve member 60. A gap exists between the insertion portion 21 and the plate portion 61, in other words, between the inner circumferential surface of the opening 24 and the circumferential surface of the plate portion 61. If the dimension of the plate portion 61 along the axis C12 is defined as the thickness of the plate portion 61, the length of the opening 24 along the axis C11 is greater than the thickness of the plate portion 61.

The insertion portion 21 includes a seating portion 25, which is continuous with the inner end of the opening 24. The seating portion 25 is inclined such that the connecting passage 22 narrows as the distance from the opening 24 increases. The diameter of the connecting passage 22 at an end of the seating portion 25 that is opposite from the opening 24 is less than the diameter of the plate portion 61 of the valve member 60.

The valve device 20 includes a cylindrical movable body 50, which is arranged in the space in the cover 29. The movable body 50 is made of, for example, a plastic. The movable body 50 is arranged such that its central axis agrees with the axis C11. The movable body 50 includes an accommodation hole 54, which receives the first pillar portion 65 of the valve member 60. The diameter of the accommodation hole 54 is greater than the diameter of the first pillar portion 65, and a gap exists between the first pillar portion 65 and the movable body 50. The movable body 50 has a flange 52 at an end closer to the insertion portion 21. A filter 55 is attached to an end of the movable body 50 that is on the side opposite from the flange 52. The filter 55 covers the accommodation hole 54. The filter 55 is a water-blocking filter, which allows passage of gas but blocks liquid.

The valve device 20 includes an elastic body 30 arranged between the movable body 50 and the insertion portion 21. The elastic body 30 has an annular shape. The elastic body 30 is arranged such that its central axis agrees with the axis C11. The elastic body 30 is made of a material having a modulus of elasticity lower than that of the valve member 60. That is, the modulus of elasticity of the elastic body 30 is lower than the modulus of elasticity of the valve member 60. An example of the material of the elastic body 30 is rubber. In the state shown in FIG. 2, the elastic body 30 is arranged to contact the end face of the open end 23 of the insertion portion 21. The elastic body 30 includes a surface that faces the movable body 50 and contacts the flange 52 of the movable body 50. The elastic body 30 and the insertion portion 21 can be separated from each other. The elastic body 30 and the movable body 50 can be separated from each other. The elastic body 30 includes a valve hole 31, which receives the first pillar portion 65. The diameter of the valve hole 31 is greater than the diameter of the first pillar portion 65, and a gap exists between the first pillar portion 65 and the elastic body 30. The diameter of the valve hole 31 is less than the diameter of the plate portion 61. The diameter of the valve hole 31 is less than the diameter of the connecting passage 22 at the position of the opening 24. The diameter of the valve hole 31 is less than the diameter of the accommodation hole 54.

The valve device 20 includes a first spring 71, which urges the valve member 60, and a second spring 72, which urges the movable body 50. The first spring 71 is arranged in the connecting passage 22. The first spring 71 presses the valve member 60 against the elastic body 30. The second spring 72 is arranged between the cover 29 and the movable body 50. The second spring 72 presses the movable body 50 against the elastic body 30. The second spring 72 presses the elastic body 30 against the insertion portion 21 through the movable body 50. That is, the second spring 72 is arranged at a position opposed to the first spring 71 with the valve member 60, the elastic body 30 and the movable body 50 in between.

In a state in which the elastic body 30 is pressed against the open end 23 of the insertion portion 21, so that the elastic body 30 is in contact with the insertion portion 21, the elastic body 30 and the movable body 50 restrict the valve member 60 from being displaced away from the seating portion 25. The elastic body 30 and the movable body 50 form a locking portion, which restricts displacement of the valve member 60.

When the elastic body 30 is pressed against the insertion portion 21 in a state in which the valve member 60 closes valve hole 31 of the elastic body 30, the valve member 60 and the elastic body 30 close the opening 24 of the connecting passage 22, so that the external space 13 and the internal space 12 are disconnected from each other. The locking portion (the elastic body 30 and the movable body 50) and the valve member 60 form a valve that disconnects the external space 13 and the internal space 12 from each other.

When the valve device 20 is in a closed state as shown in FIG. 2, the second spring 72 presses the elastic body 30 against the insertion portion 21. The first spring 71 presses the valve member 60 against the elastic body 30, which is pressed against the insertion portion 21. The spring load of the first spring 71 and the spring load of the second spring 72 are set such that the elastic force of the second spring 72 is greater than the elastic force of the first spring 71 in the state shown in FIG. 2.

In the breather 10, the valve device 20 is in a closed state in a range of the pressure difference between the internal space 12 and the external space 13 that includes 0. When the pressure of the internal space 12 increases so that the pressure difference exceeds a preset discharge pressure difference, the valve device 20 is in an open state, so that air is discharged to the external space 13 from the internal space 12 via the connecting passage 22. In contrast, when the pressure of the internal space 12 decreases so that the pressure difference falls below a preset suction pressure difference, the valve device 20 is in a closed state, so that air is drawn into the internal space 12 from the external space 13 via the connecting passage 22.

The discharge pressure difference and the suction pressure difference can be changed by adjusting the spring load of the first spring 71 and the spring load of the second spring 72. Also, the valve member 60, the movable body 50, and the elastic body 30 receive pressures from the internal space 12 and the external space 13. The discharge pressure difference and the suction pressure difference thus also can be changed by adjusting the area of the section of the valve member 60 that receives the pressure of the internal space 12, the area of the section of the valve member 60 that receives the pressure of the external space 13, and the areas of the sections of the movable body 50 and the elastic body 30 that receive the pressure of the external space 13.

The valve member 60, the locking portion, which restricts displacement of the valve member 60, the seating portion 25, the valve hole 31 of the elastic body 30, the first spring 71, which urges the valve member 60, and the second spring 72, which urges the locking portion, form a valve structure that selectively closes and opens the connecting passage 22.

The valve member 60 will now be described with reference to FIGS. 2 to 5.

Figure 4:
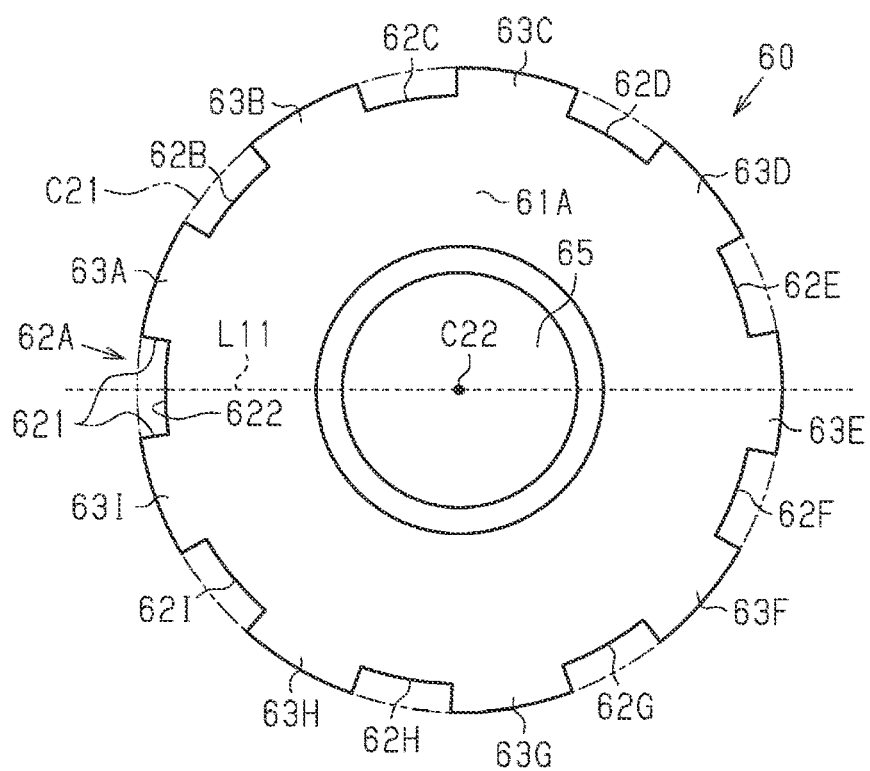
FIG. 4 is a front view of the valve member shown in FIG. 3.

The valve member 60 includes ventilating portions, which are radially inward recesses on the edge (the side surface or the circumferential surface) of the plate portion 61. The dimension of the plate portion 61 along a straight line orthogonal to the axis C12 is short in a section where a ventilating portion is provided. The plate portion 61 has nine ventilating portions. As shown in FIG. 4, the plate portion 61 has first to ninth ventilating portions 62A to 62I, which are equally spaced apart in the circumferential direction. The first to ninth ventilating portions 62A to 62I are arranged clockwise along the circumference of the plate portion 61 when the plate portion 61 is viewed from a position facing the first surface 61A. The ventilating portions 62A to 62I have the same shape and the same dimensions. FIG. 2 shows only the first ventilating portion 62A among the ventilating portions.

The edge of the plate portion 61 includes contact portions, each of which is located between two of the ventilating portions adjacent to each other in the circumferential direction. The plate portion 61 has nine contact portions, the number of which is the same the number of the first to ninth ventilating portions 62A to 62I. The contact portion between the first ventilating portion 62A and the second ventilating portion 62B is a first contact portion 63A, and the first to ninth contact portions 63A to 63I are arranged in that order along the circumference of the plate portion 61. The contact portions 63A to 63I have the same shape and the same dimensions.

FIG. 4 shows an imaginary circle C21 with the long-dash double-short-dash lines. The imaginary circle C21 extends along the edges of the first to ninth contact portions 63A to 63I. The imaginary circle C21 corresponds to the outer edge of the plate portion 61 in a case in which the plate portion 61 does not have any ventilating portions. That is, the diameter of the imaginary circle C21 is equal to the dimension of the plate portion 61 along a straight line orthogonal to the axis C12 in a case in which the plate portion 61 does not have any ventilating portions. FIG. 4 shows a center C22 of the imaginary circle C21. The center C22 of the imaginary circle C21 is a point on the central axis of the valve member 60, that is, on the axis C12. The center C22 agrees with the center of the first surface 61A of the plate portion 61.

In the valve member 60, when a value is obtained by subtracting the cross-sectional area of the first pillar portion 65 on the same plane as the first surface 61A from the area of the imaginary circle C21, the surface area of the first surface 61A is less than the obtained value by an amount corresponding to the first to ninth ventilating portions 62A to 62I. Likewise, when a value is obtained by subtracting the cross-sectional area of the second pillar portion 66 on the same plane as the second surface 61B from the area of the imaginary circle C21, the surface area of the second surface 61B is less than the obtained value by an amount corresponding to the first to ninth ventilating portions 62A to 62I.

The arc length of each of the contact portions 63A to 63I is one eighteenth of the circumferential length of the imaginary circle C21. That is, the sum of the arc lengths of all the contact portions 63A to 63I is equal to half the circumferential length of the imaginary circle C21. In other words, the first to ninth contact portions 63A to 63I are provided in the regions of the imaginary circle C21 that correspond to half the circumferential length, and the first to ninth ventilating portions 62A to 62I are provided in the regions that correspond to the other half.

FIG. 4 shows a first straight line L11, which is an imaginary line that passes through the center C22 and the first ventilating portion 62A. In the plate portion 61, the fifth contact portion 63E is provided at a position opposite the first ventilating portion 62A on the first straight line L11. Likewise, the sixth contact portion 63F is provided at a position opposite the second ventilating portion 62B on a straight line that passes through the center C22 and the second ventilating portion 62B. In this manner, a contact portion is provided at a position opposite each of the ventilating portions 62A to 62I in the plate portion 61 of the valve member 60. In other words, the ventilating portions of the valve member 60 are arranged such that a straight line passing through each ventilating portion and the center of the plate portion 61 does not pass through the other ventilating portions.

As shown in FIG. 3, the ventilating portions 62A to 62I each have a shape formed by recessing the side surface (or the circumferential surface) of the plate portion 61 toward the axis C12, that is, inward in the radial direction. Each of the ventilating portions 62A to 62I is configured to have two recess side surfaces 621, which extend in the radial direction and are opposed to each other in the circumferential direction, and a bottom surface 622, which extends in the circumferential direction to connect the ends in the radial direction of the recess side surfaces 621 to each other. The dimensions of the recess side surfaces 621 and the bottom surface 622 in the direction along the axis C12 are equal to the dimension of the side surface of the plate portion 61 in the direction along the axis C12.

When the valve member 60 is viewed from a position facing the first surface 61A, the recess side surfaces 621 extend linearly from the circumference of the imaginary circle C21 toward the center C22 as shown in FIG. 4. Likewise, when the valve member 60 is viewed from a position facing the first surface 61A, the bottom surface 622 extends arcuately.

Figure 5:
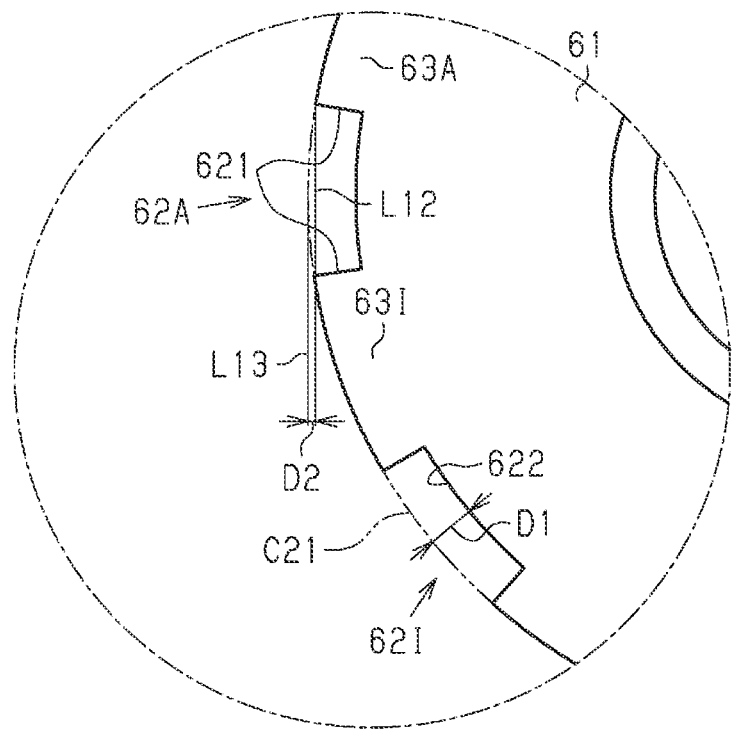
FIG. 5 is an enlarged diagram of a part of the valve member shown in FIG. 4.

FIG. 5 shows a depth D1 of the ninth ventilating portion 62I, which is the dimension from the imaginary circle C21 to the bottom surface 622. While FIG. 5 shows the valve member 60 as viewed from a position facing the first surface 61A, the dimension from the imaginary circle C21 to the bottom surface 622 of the ninth ventilating portion 62I is also the depth D1 when the valve member 60 is viewed from a position facing the second surface 61B.

FIG. 5 shows a second straight line L12 of the first ventilating portion 62A that passes through the outer ends in the radial direction of the two recess side surfaces 621. Specifically, the first contact portion 63A and the ninth contact portion 63I, which are located on the opposite sides in the circumferential direction of the first ventilating portion 62A, have edges, and the edges each include a corner on the side next to the first ventilating portion 62A. The second straight line L12 passes through these corners. The second straight line L12 coincides with one of the chords of the imaginary circle C21. FIG. 5 shows a third straight line L13 that is a tangent line of the imaginary circle C21 and parallel with the second straight line L12. The dimension between the second straight line L12 and the third straight line L13 is defined as a diminution D2. The plate portion 61 has the first ventilating portion 62A. Therefore, when the plate portion 61 contacts the inner wall of the insertion portion 21, the distance from the center of the plate portion 61 to the inner wall of the insertion portion 21 is less than that of a disk having the same shape as the imaginary circle C21 by an amount up to the diminution D2.

Figure 6:
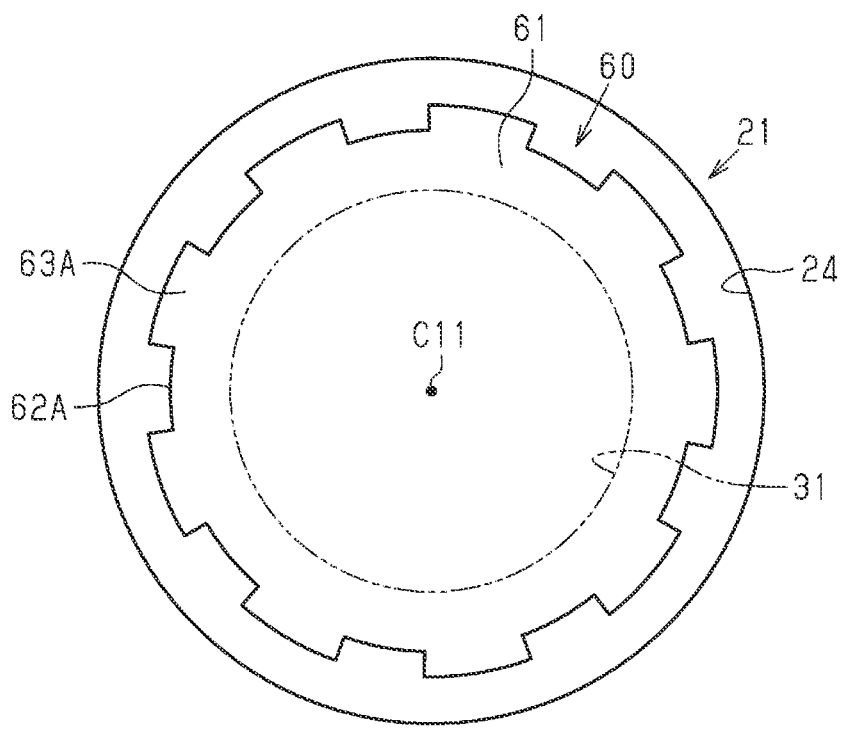
FIG. 6 is a schematic diagram of the valve device shown in FIG. 2.
Figure 7:
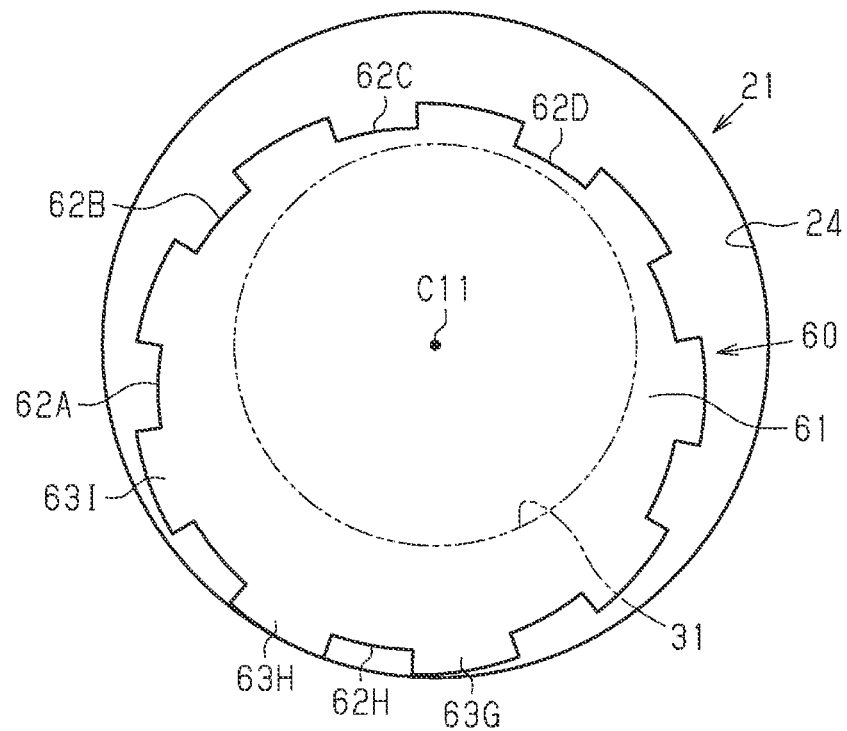
FIG. 7 is a schematic diagram of the valve device shown in FIG. 2.

FIGS. 6 and 7 show the plate portion 61 of the valve member 60, the opening 24 of the insertion portion 21, and the valve hole 31 of the elastic body 30. FIGS. 6 and 7 show the plate portion 61 when viewed from a position facing the second surface 61B, and do not show the second pillar portion 66. For the illustrative purposes, FIGS. 6 and 7 schematically show the relationship among dimensions, but do not illustrate the actual dimensions.

FIG. 6 illustrates an example in which the plate portion 61 is arranged such that the central axis of the valve member 60 agrees with the central axis of the connecting passage 22. That is, the central axis of the valve member 60 agrees with the axis C11. When the central axis of the valve member 60 agrees with the axis C11 as shown in FIG. 6, the plate portion 61 closes the valve hole 31. The valve hole 31 is closed when the first surface 61A of the plate portion 61 contacts the elastic body 30 as shown in FIG. 2. That is, the first surface 61A of the plate portion 61 includes a sealing surface having a diameter greater than the diameter of the valve hole 31.

Figure 8:
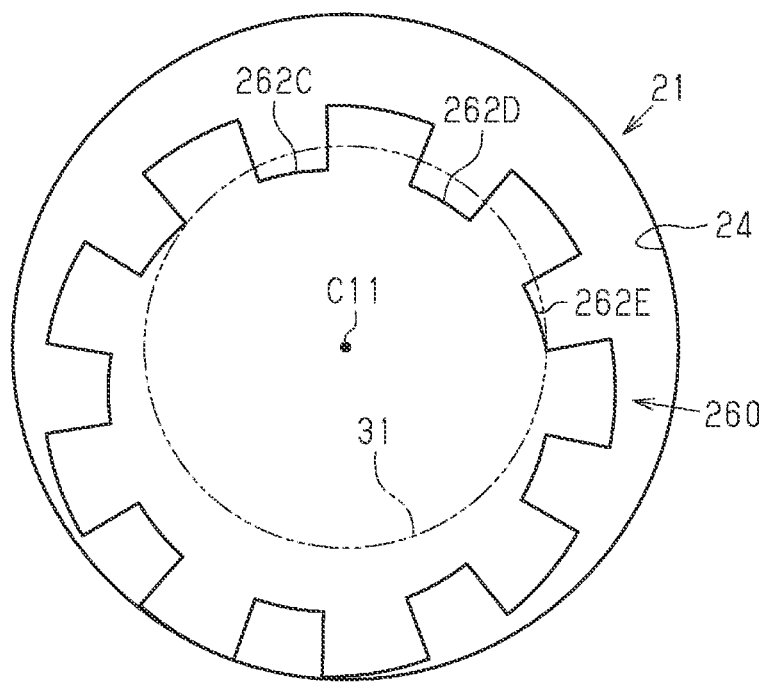
FIG. 8 is a schematic diagram of a valve device of a comparative example.

FIG. 7 illustrates an example in which the central axis of the valve member 60 shifts from the axis C11 so that the plate portion 61 contacts the inner wall of the insertion portion 21. Specifically, the seventh contact portion 63G and the eighth contact portion 63H of the plate portion 61 are in contact with the inner wall of the insertion portion 21. Even if the valve member 60 shifts to a position shown in FIG. 7, the valve member 60 closes the valve hole 31 using the plate portion 61. FIG. 8 shows a valve member 260 as a comparative example. The valve member 260 is the same as the valve member 60 except that the valve member 260 has deeper ventilating portions than the valve member 60. In the example shown in FIG. 8, ventilating portions 262C to 262E overlap with the valve hole 31, so that the valve hole 31 is open. In this manner, whether the valve hole 31 is closed when the position of a valve member shifts depends on the depth of the ventilating portions if the size of the valve member is the same. In the valve device 20, the positions and sizes of the ventilating portions 62A to 62I are set such that the valve hole 31 does not overlap with any of the first to ninth ventilating portions 62A to 62I even if the valve member 60 shifts to the position shown in FIG. 7. In the example shown in FIG. 7, although the fourth ventilating portion 62D, which is opposite the eighth contact portion 63H, is closest to the valve hole 31, the fourth ventilating portion 62D is located outward of the valve hole 31 in the radial direction.

In reality, the valve member 60 includes the first pillar portion 65. The first pillar portion 65 is inserted in the valve hole 31 as shown in FIG. 2. Thus, the first pillar portion 65 and the elastic body 30 contacting each other restricts the valve member 60 from being displaced in a direction in which the central axis of the valve member 60 shifts from the central axis of the connecting passage 22. That is, the contact portions 63A to 63I are unlikely to contact the inner wall of the insertion portion 21 as shown in FIG. 7. The range in which the valve member 60 is displaceable is determined taking into consideration restriction of displacement of the valve member 60 by the first pillar portion 65 and the elastic body 30. The positions and the sizes of the ventilating portions 62A to 62I simply need to be set such that the valve hole 31 does not overlap with any of the first to ninth ventilating portions 62A to 62I at least when the valve member 60 is located within the displaceable range.

An operation of the present embodiment will now be described.

Figure 9:
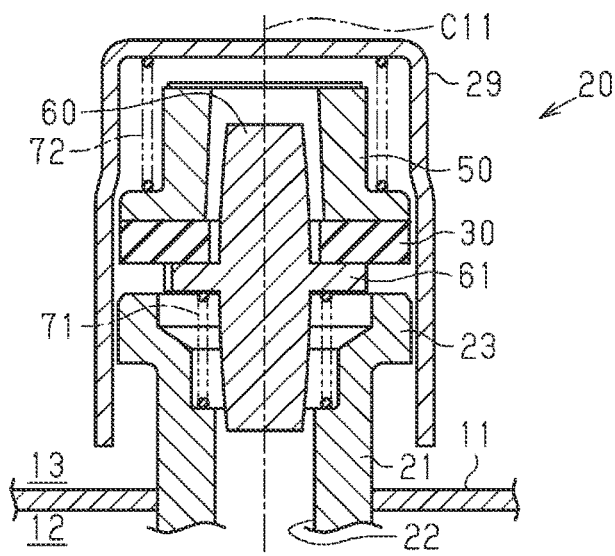
FIG. 9 is a cross-sectional view showing a state in which the valve device shown in FIG. 2 discharges air.

FIG. 9 illustrates the position of the valve member 60 when air is discharged from the internal space 12 to the external space 13. An increase in the pressure of the internal space 12 increases the force that pushes the valve member 60, the elastic body 30, and the movable body 50 away from the insertion portion 21. If the increased force exceeds the elastic force of the second spring 72, the valve member 60, the elastic body 30, and the movable body 50 are displaced away from the insertion portion 21. Since the elastic body 30 is separated from the insertion portion 21, the connecting passage 22 is opened, so that the internal space 12 and the external space 13 are connected to each other. When the valve device 20 is in this state, the pressure of the internal space 12 is higher than the pressure of the external space 13, so that air is discharged from the internal space 12 to the external space 13. The air in the internal space 12 is discharged to the external space 13 through the connecting passage 22 and the gap between the insertion portion 21 and the cover 29.

Figure 10:
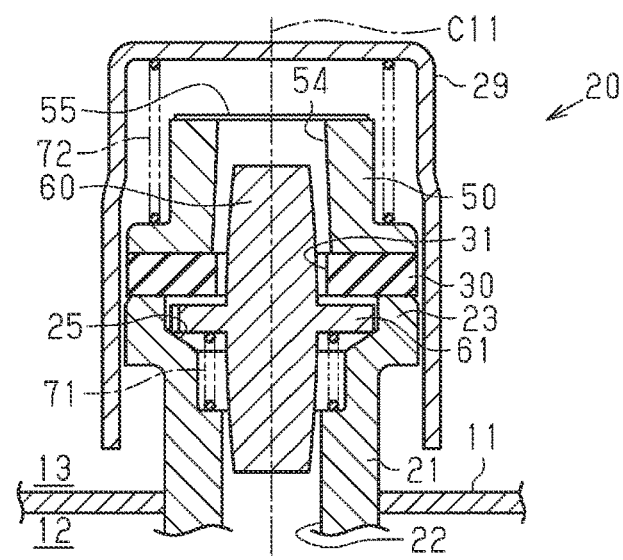
FIG. 10 is a cross-sectional view showing a state in which the valve device shown in FIG. 2 draws air.

FIG. 10 illustrates the position of the valve member 60 when air is drawn into the internal space 12 from the external space 13. When the pressure of the internal space 12 decreases, and the force that draws the valve member 60 toward the seating portion 25 exceeds the elastic force of the first spring 71, the valve member 60 is displaced toward the seating portion 25. Since the valve member 60 is separated from the elastic body 30, the valve hole 31 is opened, so that the internal space 12 and the external space 13 are connected to each other. When the valve device 20 is in this state, the pressure of the internal space 12 is lower than the pressure of the external space 13, so that air is drawn into the internal space 12 from the external space 13. The air of external space 13 enters the space surrounded by the cover 29 through the gap between the insertion portion 21 and the cover 29 and is then drawn into the internal space 12 through the accommodation hole 54, the valve hole 31, and the connecting passage 22. The air passes through the filter 55 when entering the accommodation hole 54.

FIG. 10 illustrates a state in which the valve member 60 has been separated from the elastic body 30 and displaced to contact the seating portion 25. At this time, the first to ninth contact portions 63A to 63I of the plate portion 61 of the valve member 60 are in contact with the seating portion 25. Since the first to ninth ventilating portions 62A to 62I are provided, gaps exist between the valve member 60 and the seating portion 25 in a state in which the valve member 60 is in contact with seating portion 25, so that external space 13 and the internal space 12 are connected to each other.

The present embodiment has the following advantages.

(1) In the breather 10, the plate portion 61 of the valve member 60 is arranged in the connecting passage 22. This allows the valve member 60 to be smoothly guided by the inner wall of the insertion portion 21 when being displaced. Also, since the valve member 60 includes the first pillar portion 65, which is inserted into the valve hole 31 and the accommodation hole 54, and the second pillar portion 66, which is inserted into the connecting passage 22, the central axis of the connecting passage 22 and the central axis of the valve member 60 are unlikely to shift from each other. Thus, displacement of the valve member 60 is stabilized when the valve device 20 repeatedly opens and closes. The stable displacement of the valve member 60 allows the elastic body 30 and the valve member 60 to closely contact each other when the valve device 20 closes.

(2) Since the plate portion 61 of the valve member 60 has the ventilating portions 62A to 62I, air flows through the ventilating portions 62A to 62I when suction of air is performed with the valve member 60 separated from the elastic body 30. Thus, as compared to a case in which the ventilating portions 62A to 62I are not provided, air smoothly flows through the connecting passage 22 during suction of air.

(3) The contact portions 63A to 63I are each located between two adjacent ventilating portions in the valve member 60. Thus, during suction, at which time the valve member 60 is separated from the elastic body 30 to open the connecting passage 22, the valve member 60 contacts the seating portion 25 at the contact portions 63A to 63I. Further, when the valve member 60 is in contact with the seating portion 25, the ventilating portions 62A to 62I create gaps between the valve member 60 and the seating portion 25.

Since the valve member 60 is allowed to contact the seating portion 25, the valve member 60 easily fits into a predetermined position when separated from the elastic body 30. This prevents the central axis of the connecting passage 22 and the central axis of the valve member 60 from shifting from each other. Further, since the ventilating portions 62A to 62I are provided, the connecting passage 22 is not closed by the valve member 60 when the valve member 60 contacts the seating portion 25. This allows the external space 13 and the internal space 12 to be connected to each other.

(4) The sizes of the ventilating portions 62A to 62I of the valve member 60 are the same, the sizes of the contact portions 63A to 63I are the same, and the contact portions 63A to 63I are arranged at equal intervals in the circumferential direction of the plate portion 61. Thus, when the valve member 60 is displaced to a position where it contacts the seating portion 25, the valve member 60 is allowed to contact the seating portion 25 in a stable orientation.

(5) The valve member 60 has the sealing surface of a diameter greater than the diameter of the valve hole 31 in the first surface 61A of the plate portion 61, in addition to the ventilating portions 62A to 62I in the plate portion 61. Further, the positions and the sizes of the ventilating portions 62A to 62I are set such that the valve hole 31 can be closed even if the central axis of the valve member 60 shifts from the central axis of the insertion portion 21. Therefore, when opening the connecting passage 22, the valve member 60 is guided by the connecting passage 22 to seat the valve member 60 on the seating portion 25, without hindering the function of closing the connecting passage 22 provided by contact between the valve member 60 and the elastic body 30. This also ensures a certain amount of air passing through the valve member 60 with the valve member 60 contacting the seating portion 25.

(6) The valve device 20 of the breather 10 has the ventilating portions 62A to 62I, which are recesses in the edge of the plate portion 61. Accordingly, a portion of the gap between the inner wall of the insertion portion 21 and the plate portion 61 of the valve member 60 is greater than that in a case in which the plate portion 61 does not have the ventilating portions 62A to 62I. If two ventilating portions were provided on a straight line orthogonal to the axis C12, the amount of increase in the sizes of the gaps, in the direction of that straight line, between the inner wall of the insertion portion 21 and the plate portion would correspond to double the diminution D2. As the gap along the straight line orthogonal to the axis C12 increases, the position of the valve member is more likely to shift when the valve member contacts the seating portion, and the center of the plate portion is more likely to approach the inner wall of the insertion portion. The seating portion 25 includes a surface that is inclined such that the connecting passage 22 narrows as the distance from the opening 24 increases. Thus, if the position of the valve member 60 shifts, the central axis of the valve member 60 tilts with respect to the axis C11, so that the valve member 60 may be out of the proper orientation.

In this respect, the valve member 60 includes contact portions, each of which is provided at a position opposite one of the ventilating portions 62A to 62I, so that only one ventilating portion is provided on each straight line orthogonal to the axis C12. Accordingly, the amount of decrease in the dimension of the plate portion 61 along each straight line orthogonal to the axis C12 is the diminution D2. As compared to a case in which two ventilating portions are provided on a straight line orthogonal to the axis C12, the gap between the inner wall of the insertion portion 21 and the plate portion 61 of the valve member 60 along such a straight line is reduced. This prevents the position of the valve member 60 from shifting when the valve member 60 contacts the seating portion 25.

(7) The contact portions 63A to 63I of the valve member 60 are configured such that the total arc length of the contact portions 63A to 63I is half the circumferential length of the imaginary circle C21. This maximizes the dimensions of the ventilating portions 62A to 62I in the circumferential direction without any straight line passing through two of the ventilating portions 62A to 62I and the center of the plate portion 61. This stabilizes the orientation of the valve member 60 seated on the seating portion 25, while ensuring flow air through the ventilating portions 62A to 62I.

(8) In the breather 10, the elastic body 30, which is contacted by the valve member 60, is made of a material having a modulus of elasticity lower than that of the valve member 60. Thus, when the valve member 60 contacts the elastic body 30, which is a locking portion, elastic deformation of the elastic body 30 allows the valve member 60 and the elastic body 30 to closely contact each other. This improves the sealing performance between the valve member 60 and the elastic body 30.

Also, when the movable body 50 contacts the elastic body 30, elastic deformation of the elastic body 30 allows the movable body 50 and the elastic body 30 to closely contact each other. This improves the sealing performance between the movable body 50 and the elastic body 30.

(9) The breather 10 includes the filter 55, which is located on the path of the flow of air from the external space 13 to the internal space 12 during suction of air. This prevents liquid from being drawn into the internal space 12 from the external space 13 during suction of air.

The above-described embodiment may be modified as follows. The above-described embodiment and the following modifications can be combined as long as the combined modifications remain technically consistent with each other.

The valve structure of the valve device 20 is not limited to the one shown in FIG. 2 in the above-described embodiment. Even in a different valve structure, it is possible to employ the valve member 60, which includes the ventilating portions 62A to 62I in the plate portion 61.

For example, a valve structure that closes and opens a connecting passage of a breather simply needs to include the valve member 60, the locking portion (the elastic body 30) that restricts displacement of the valve member 60, the valve hole 31 of the locking portion, the first spring 71, which urges the valve member 60, and the seating portion 25. Even such a valve structure is capable of drawing air to the internal space 12 from the external space 13 when the pressure of the internal space 12 is lower than the pressure of the external space 13. If the valve member 60 has ventilating portions, it is possible to achieve advantage similar to those of the valve structure of the above-described embodiment, which is provided with the ventilating portions 62A to 62I are provided.

Also, for example, the ventilating portions 62A to 62I that are the same as those in the above-described embodiment may be employed in a valve structure at the inner end of the insertion portion 21. The connecting passage 22 includes an opening that is located at the inner end of the insertion portion 21 and opens to the internal space 12. The insertion portion 21 includes a seating portion at the inner end and a locking portion having a valve hole. A valve member is accommodated between the seating portion and the locking portion. The valve member is pressed against the locking portion by a spring that urges the valve member. With such a valve structure, when the pressure of the internal space 12 is higher than the pressure of the external space 13, air is discharged to the external space 13 from the internal space 12. At the discharge of air, the ventilating portions 62A to 62I ensure that a large amount of air passes through the connecting passage.

The elastic body 30 may be attached to the movable body 50, so that the elastic body 30 and the movable body 50 are integrally displaceable.

The elastic body 30 may be omitted from the components of the locking portion. In this case, the flange 52 of the movable body 50 contacts the insertion portion 21. In a state in which the flange 52 is pressed against the insertion portion 21, the flange 52 restricts displacement of the valve member 60.

When a configuration in which the elastic body 30, which functions as a locking portion, is omitted, the movable body 50 may be made of a material having a modulus of elasticity less than that of the valve member 60. This improves the sealing performance between the valve member 60 and the movable body 50.

The filter 55, which is attached to the movable body 50, is not a required component.

In the above-described embodiment, a valve member 60 made of a plastic may be used. The material of the valve member 60 is not limited to this, but may be changed. The materials of the valve member 60 and the locking portion are preferably selected to improve the sealing performance of the valve member 60 and the locking portion.

In the above-described embodiment, the valve member 60 includes the nine ventilating portions 62A to 62I. The number of the ventilating portions is not limited to this. The number of the ventilating portions may be less than or greater than nine. If the number of the ventilating portions is an odd number, the ventilating portions can be arranged in a balanced manner since a contact portion is provided at a position opposite each ventilating portion in the plate portion.

The shapes and dimensions of the ventilating portions 62A to 62I in the above-described embodiment are merely examples. For example, the depth of the ventilating portions 62A to 62I may be changed. The dimensions of the ventilating portions 62A to 62I may be changed such that the diminution D2 related to the ventilating portions 62A to 62I is changed.

In the above-described embodiment, the bottom surface 622 of each of the ventilating portions 62A to 62I is an arcuate surface as shown in FIG. 4. The shape of the bottom surface 622 is not limited to this. For example, the bottom surface 622 may be a flat surface that linearly connects the inner ends of the two recess side surfaces 621 in the radial direction to each other.

The above-described embodiment includes the ventilating portions 62A to 62I, which are recesses toward the axis C12 in the side surface of the plate portion 61 as shown in FIGS. 3 and 4. The shape of the ventilating portions formed in the plate portion is not limited to the one shown in the above-described embodiment as long as a sealing surface that closes the valve hole 31 is provided, and it is ensured that a relatively great amount of air passes through the connecting passage 22 when the valve hole 31 is opened. For example, the plate portion may have ventilating portions as shown in FIG. 11.

Figure 11:
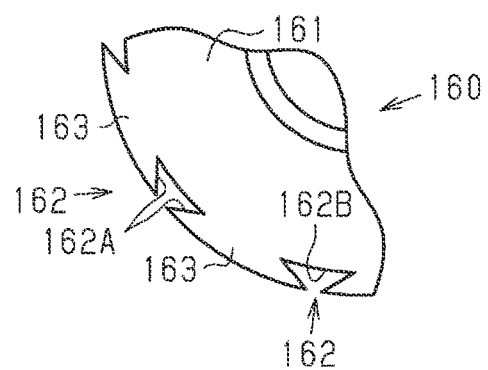
FIG. 11 is a diagram showing a valve member according to a modification.

FIG. 11 shows a valve member 160 that includes a plate portion 161. The plate portion 161 includes ventilating portions 162 and contact portions 163. Each ventilating portion 162 has two recessed side faces 162A and a bottom surface 162B. In each ventilating portion 162, the two recessed side faces 162A approach each other as the distance from the bottom surface 162B increases. That is, the ventilating portion 162 narrows toward the outer end of the plate portion 161 in the radial direction as shown in FIG. 11.

In the above-described embodiment, the all the ventilating portions 62A to 62I have the same shape. However, some of the ventilating portions may have a shape different from that of the other ventilating portions. Even in this case, a contact portion is preferably provided at a position opposite each ventilating portion in the plate portion.

In the above-described embodiment, the valve member 60 includes the first pillar portion 65 and the second pillar portion 66. As long as the valve member 60 includes the plate portion 61, the valve member 60 is capable of closing and opening the valve hole 31. That is, a valve member that does not have the first pillar portion 65 or the second pillar portion 66 may be employed. Alternatively, a valve member that has either the first pillar portion 65 or the second pillar portion 66 may be employed.

The gearbox 90 in the above-described embodiment is merely an example of a device that is accommodated in the case 11. Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A breather, comprising:
    a case that includes an internal space, the internal space being configured to accommodate a device; and
    a valve device that seals the internal space, wherein
    the valve device is configured to open on a basis of a pressure difference between the internal space and an external space, which is a space outside the case, thereby performing at least one of suction of air from the external space to the internal space and discharge of air from the internal space to the external space,
    the valve device includes:
        an insertion portion that extends through the case and includes a connecting passage, the connecting passage connecting the internal space and the external space to each other, and
        a valve structure that is configured to selectively close and open the connecting passage,
    the valve structure includes:
        a valve member that is arranged in the connecting passage and displaceable in the connecting passage,
        a locking portion that restricts displacement of the valve member, the locking portion including a valve hole with a diameter less than a diameter of the valve member, and
        a spring that presses the valve member against the locking portion,
    the insertion portion includes a seating portion located on an opposite side of the valve member from the locking portion,
    the seating portion is inclined such that the connecting passage narrows as a distance from the locking portion increases,
    the valve member includes:
        a disk-shaped plate portion having a sealing surface, the sealing surface having a diameter greater than the diameter of the valve hole, and
        a ventilating portion, which is a radially inward recess on an edge of the plate portion, and
    the valve structure is configured to:
        close the valve hole with the sealing surface contacting the locking portion, thereby closing the connecting passage,
        open the connecting passage by separating the valve member from the locking portion, and
        connect the external space and the internal space to each other via the ventilating portion in a state in which the valve member is separated from the locking portion and is in contact with the seating portion.

2. The breather according to claim 1, wherein the ventilating portion includes ventilating portions that are equally spaced apart in a circumferential direction of the plate portion.

3. The breather according to claim 2, wherein the ventilating portions are arranged such that any straight line that passes through a center of the plate portion and one of the ventilating portions does not pass through any other one of the ventilating portions.

4. The breather according to claim 3, wherein the edge of the plate portion includes contact portions, each of which is located between two of the ventilating portions adjacent to each other in the circumferential direction of the plate portion, the plate portion includes an odd number of the ventilating portions and the contact portions, the number of the contact portions being equal to the number of the ventilating portions, all the contact portions have an equal arc length, and a sum of the arc lengths of the contact portions is half a circumferential length of the plate portion.

5. The breather according to claim 1, wherein the locking portion has a modulus of elasticity less than that of the valve member.

6. The breather according to claim 1, wherein the connecting passage includes an opening, the insertion portion includes an end having the opening, the locking portion is arranged in the end of the insertion portion, and the valve member is configured to be pressed against the locking portion by the spring in a direction separating the locking portion from the end of the insertion portion.

7. The breather according to claim 1, wherein the connecting passage includes an opening that is open to the external space, the insertion portion includes an end having the opening, the locking portion is arranged in the end of the insertion portion, the spring is a first spring, the valve member is configured to be pressed against the locking portion by the first spring in a direction separating the locking portion from the end of the insertion portion, the valve structure further includes a second spring that presses the locking portion against the end of the insertion portion, and the valve structure is configured to close the connecting passage by causing the valve member to close the valve hole and the locking portion to be pressed against the end of the insertion portion.

* * * * *